United States Patent
Saiki et al.

(10) Patent No.: US 12,264,073 B2
(45) Date of Patent: Apr. 1, 2025

(54) COMPOSITE MATERIAL

(71) Applicant: ADEKA CORPORATION, Tokyo (JP)

(72) Inventors: Tomoaki Saiki, Tokyo (JP); Hideyuki Yokota, Tokyo (JP); Ryo Taniuchi, Tokyo (JP); Toru Yano, Tokyo (JP)

(73) Assignee: ADEKA CORPORATION, Tokyo (JP)

( * ) Notice: Subject to any disclaimer, the term of this patent is extended or adjusted under 35 U.S.C. 154(b) by 700 days.

(21) Appl. No.: 17/259,812

(22) PCT Filed: Jul. 29, 2019

(86) PCT No.: PCT/JP2019/029586
§ 371 (c)(1),
(2) Date: Jan. 12, 2021

(87) PCT Pub. No.: WO2020/027023
PCT Pub. Date: Feb. 6, 2020

(65) Prior Publication Data
US 2021/0221689 A1    Jul. 22, 2021

(30) Foreign Application Priority Data
Jul. 30, 2018 (JP) ................. 2018-142982

(51) Int. Cl.
| | | |
|---|---|---|
| C01B 32/225 | (2017.01) | |
| C01B 21/064 | (2006.01) | |
| C08K 9/04 | (2006.01) | |
| C08L 101/00 | (2006.01) | |
| C09D 135/02 | (2006.01) | |
| C09D 163/00 | (2006.01) | |
| C09D 175/04 | (2006.01) | |

(52) U.S. Cl.
CPC ........ *C01B 32/225* (2017.08); *C01B 21/0648* (2013.01); *C08K 9/04* (2013.01); *C08L 101/00* (2013.01); *C09D 135/02* (2013.01); *C09D 163/00* (2013.01); *C09D 175/04* (2013.01); *C01B 2204/32* (2013.01)

(58) Field of Classification Search
CPC .............. C01B 32/225; C01B 21/0648; C01B 2204/32; C01B 32/21; C01B 21/064; C08K 9/04; C08K 3/04; C08K 2003/385; C08K 2201/006; C08K 3/00; C08K 7/00; C08L 101/00; C09D 135/02; C09D 163/00; C09D 175/04; C01P 2004/24
See application file for complete search history.

(56) References Cited

U.S. PATENT DOCUMENTS

| | | | | |
|---|---|---|---|---|
| 4,189,548 | A * | 2/1980 | Sakashita | ............. C08F 240/00 523/450 |
| 2006/0009562 | A1 * | 1/2006 | Sasaki | ................... C08G 65/18 524/430 |
| 2012/0301707 | A1 | 11/2012 | Kinloch et al. | |
| 2013/0296479 | A1 | 11/2013 | Martin et al. | |
| 2013/0310499 | A1 | 11/2013 | Osano et al. | |
| 2014/0079932 | A1 * | 3/2014 | Aksay | ................... B82Y 30/00 428/220 |
| 2014/0225026 | A1 * | 8/2014 | Park | ...................... C08K 3/042 524/700 |
| 2014/0272350 | A1 | 9/2014 | Kim et al. | |
| 2016/0101980 | A1 | 4/2016 | Hasegawa et al. | |
| 2016/0167969 | A1 | 6/2016 | Inui et al. | |
| 2016/0200580 | A1 | 7/2016 | Liu et al. | |
| 2016/0222195 | A1 | 8/2016 | Ju et al. | |
| 2017/0058107 | A1 | 3/2017 | Ju et al. | |
| 2017/0233554 | A1 | 8/2017 | Ju et al. | |
| 2018/0186954 | A1 | 7/2018 | Zheng et al. | |

FOREIGN PATENT DOCUMENTS

| | | |
|---|---|---|
| JP | H07-165470 | 6/1995 |
| JP | H1171523 A | 3/1999 |
| JP | 2012-062452 A | 3/2012 |
| JP | 2015-040211 A | 3/2015 |
| JP | 2015-157748 A | 9/2015 |
| JP | 2016-029002 A | 3/2016 |
| JP | 2016-060887 | 4/2016 |
| JP | 2016-110953 | 6/2016 |
| JP | 2016141808 A | 8/2016 |
| JP | WO2015125740 A1 | 3/2017 |
| JP | 2017-141345 | 8/2017 |
| WO | 2013/172350 | 11/2013 |

OTHER PUBLICATIONS

Yasmin, et al., Mechanical and thermal properties of graphite platelet/epoxy composites, Polymer 2004; 45: 8211-8219 (Year: 2004).*

Fitzer, et al., Recommended Terminology for the Description of Carbon as a Solid, Pure & Appl. Chem. 1995; 67(3): 473-508 (Year : 1995).*

(Continued)

*Primary Examiner* — Daniel C. McCracken
(74) *Attorney, Agent, or Firm* — NIXON & VANDERHYE

(57) ABSTRACT

Provided is a composite material that has improved dispersibility of an exfoliated layered substance in a resin or the like and can thus significantly improve the properties, such as impact resistance, of a synthetic resin. A composite material in which the surface of an exfoliated layered substance is coated with a compound having a reactive group, wherein the compound having a reactive group is a compound having at least one reactive group selected from the group consisting of an epoxy group, an oxetanyl group, an isocyanate group, an acrylic group, a methacrylic group, a vinyl ether group, a vinyl ester group, and a hydrolyzable silyl group, and the compound having a reactive group is contained in an amount of 0.1 to 100 parts by mass, with respect to 100 parts by mass of the exfoliated layered substance.

10 Claims, No Drawings

(56) References Cited

OTHER PUBLICATIONS

Mu et al., "Thermal conductivity of 2D nanostructured graphitic materials and their composites with epoxy resins," 2D Materials, vol. 4, 2017, pp. 1-22.
International Search Report for PCT/JP2019/029586 dated Oct. 8, 2019, 3 pages.
Written Opinion of the ISA for PCT/JP2019/029586 dated Oct. 8, 2019, 4 pages.
Wei et al., "Epoxy/graphene nanocomposites—processing and properties: a review", RSC Advances, 2015, vol. 5, pp. 73510-73524.
Yasmin et al., "Mechanical and thermal properties of graphite platelet/epoxy composites", Polymer, vol. 45, 2004, pp. 8211-8219.

* cited by examiner

COMPOSITE MATERIAL

CROSS-REFERENCE TO RELATED APPLICATIONS

This application is the U.S. national phase of International Application No. PCT/JP2019/029586 filed Jul. 29, 2019 which designated the U.S. and claims priority to JP 2018-142982 filed Jul. 30, 2018, the entire contents of each of which are hereby incorporated by reference.

BACKGROUND OF THE INVENTION

Field of the Invention

The present invention relates to a composite material in which the surface of an exfoliated layered substance is coated with a compound having a reactive group.

Description of the Related Art

Exfoliated graphite such as graphene obtained by exfoliating graphite, which is a layered substance, is used as a conductive assistant for electrodes of secondary batteries (see Patent Literature 1, for example), a conductive ink (see Patent Literature 2, for example), a filler for resins and elastomers (see Patent Literatures 3 and 4, for example), a gas barrier material (see Patent Literatures 5 and 6, for example), or the like. Exfoliating a layered substance results in a reduction in the thickness of the layered substance. The smaller the number of layers is, the more likely the layered substance is to aggregate, and the lower the dispersibility in a matrix is. Due to this problem, there are cases where sufficient properties cannot be obtained. In order to improve the aggregation properties and the dispersibility in a solvent or the like, exfoliated graphite (see Patent Literature 7, for example) whose surface is coated with a polymer such as polyvinyl alcohol has been studied, but a sufficient effect in improving dispersibility when added to a resin or the like is not obtained.

CITATION LIST

Patent Literature

Patent Literature 1: JP 2016-060887A
Patent Literature 2: US 2016101980 (A1)
Patent Literature 3: US 2012301707 (A1)
Patent Literature 4: US 2013296479 (A1)
Patent Literature 5: US 2014272350 (A1)
Patent Literature 6: US 2018186954 (A1)
Patent Literature 7: US 2016200580 (A1)

SUMMARY OF INVENTION

Problems to be Solved by the Invention

An object of the present invention is to provide an exfoliated layered substance that has favorable dispersibility when added to a resin or the like and provides a great effect of improving the properties of the resin or the like.

Means for Solving the Problems

The inventors of the present invention have conducted in-depth study regarding the above-described object and found that it is possible to achieve the above-described object by coating the surface of an exfoliated layered substance with a compound having a specific reactive group, and the present invention was thus completed. That is to say, the present invention relates to composite material including: an exfoliated layered substance; and a compound having a reactive group and coating a surface of the exfoliated layered substance, wherein the compound having a reactive group is a compound having at least one reactive group selected from the group consisting of an epoxy group, an oxetanyl group, an isocyanate group, an acrylic group, a methacrylic group, a vinyl ether group, a vinyl ester group, and a hydrolyzable silyl group, and the compound having a reactive group is contained in an amount of 0.1 to 100 parts by mass, with respect to 100 parts by mass of the exfoliated layered substance.

Advantageous Effects of Invention

The present invention improves dispersibility of an exfoliated layered substance in a resin or the like and thereby significantly improves the properties, such as impact resistance, of the resin or the like.

DESCRIPTION OF THE PREFERRED EMBODIMENTS

Exfoliated Layered Substance

A composite material of the present invention contains an exfoliated layered substance. A layered substance has a layered structure in which unit layers individually formed through strong bonding, such as covalent or ionic bonding, are stacked together mainly via weak van der Waals forces. Graphites, boron nitrides, transition metal dichalcogenides, group 13 chalcogenides, group 14 chalcogenides, bismuth chalcogenides, layered metal halides, layered transition metal oxides, layered metal phosphates, layered perovskite oxides, clay minerals, layered silicates, and the like may be used as the layered substance. In the present invention, it is preferable to use a graphite or a boron nitride as the layered substance, because a composite material having even more favorable dispersibility can be obtained.

The graphites are layered compounds that have unit layers made of carbon. The graphites include graphite, expanded graphite in which the interlayer spacing of graphite is expanded, and graphite oxide obtained by oxidizing graphite using an oxidizing agent.

The boron nitrides are layered substances that contain nitrogen and boron as constituent elements. The boron nitrides include boron nitride (BN), boron carbon nitride (BCN), and the like.

The transition metal dichalcogenides are layered substances made of a transition metal and a chalcogen, and are represented by the formula $MX_2$, wherein M represents a transition metal and X represents a chalcogen. Titanium, zirconium, hafnium, vanadium, niobium, chromium, molybdenum, tungsten, technetium, rhenium, nickel, tin, palladium, and platinum may be used as the transition metal. Sulfur, selenium, and tellurium may be used as the chalcogen. Specific examples of the transition metal dichalcogenides include $TiS_2$, $TiSe_2$, $TiTe_2$, $HfS_2$, $HfSe_2$, $HfTe_2$, $VTe_2$, $VSe_2$, $NbS_2$, $NbSe_2$, $NbTe_2$, $MoS_2$, $MoSe_2$, $MoTe_2$, $WS_2$, $WSe_2$, $WTe_2$, $TcS_2$, $ReSe_2$, $ReS_2$, $ReTe_2$, $TaS_2$, $TaSe_2$, $TaTe_2$, and $PtTe_2$.

The group 13 chalcogenides are layered substances made of gallium or indium, which are group 13 elements, and the above-described chalcogen. Specific examples of the group 13 chalcogenides include GaS, GaSe, GaTe, and InSe.

The group 14 chalcogenides are layered substances made of germanium, tin, or lead, which are group 14 elements, and the above-described chalcogen. Specific examples of the group 14 chalcogenides include GeS, $SnS_2$, $SnSe_2$ and PbO.

The bismuth chalcogenides are layered substances made of bismuth and the above-described chalcogen. Specific examples of the bismuth chalcogenides include $Bi_2Se_3$ and $Bi_2Te_3$.

The layered metal halides are layered substances made of a metal element and a halogen. Specific examples of the layered metal halides include $MgBr_2$, $CdCl_2$, $CdI_2$, $AgF_2$, $AsI_3$, and $AlCl_3$.

The layered transition metal oxides are layered substances made of an oxide or an oxyacid of a transition metal such as titanium, manganese, molybdenum, niobium, and vanadium. Specific examples of the layered transition metal oxides include $MoO_3$, $Mo_{18}O_{52}$, $V_2O_5$, $LiNbO_2$, $K_2Ti_2O_5$, $K_2Ti_4O_9$, and $KTiNbO_5$.

The layered metal phosphates are layered phosphates of titanium, zirconium, selenium, tin, zirconium, aluminum, or the like. Specific examples of the layered metal phosphates include $Ti(HPO_4)_2$, $Ce(HPO_4)_2$, $Zr(HPO_4)_2$, and $AlH_2P_3O_{10}$.

Examples of the layered perovskite oxides include $KCa_2Nb_3O_{10}$, $KSr_2Nb_3O_{10}$, and $KLaNb_2O_7$.

Examples of the clay minerals or the layered silicates include smectites such as montmorillonite, nontronite, and saponite; kaolin, pyrophyllite, talc, vermiculite, micas, brittle micas, chlorite, sepiolite, palygorskite, imogolite, allophane, hisingerite, magadiite, and kanemite.

In the present invention, the term "exfoliated layered substance" refers to a substance that is obtained by exfoliating a layered substance and has a layered structure having one layer to several thousand unit layers of the layered substance stacked together. The smaller the number of layers of the exfoliated layered substance is, and hence the smaller the thickness of the exfoliated layered substance is, the more likely the exfoliated layered substance is to aggregate, but the greater the property-improving effect provided by the exfoliated layered substance is. From the viewpoints of obtaining a better property-improving effect and achieving excellent economic efficiency, it is preferable that the average thickness of the exfoliated layered substance is 1,200 nm or less, more preferably 0.3 to 1,200 nm, even more preferably 1.5 to 400 nm, and most preferably 3 to 200 nm.

In the present invention, the thickness of the exfoliated layered substance means the thickness in a direction that is perpendicular to the layer-stacking plane of the exfoliated layered substance. The average thickness of the exfoliated layered substance means the average value of the thicknesses of thirty or more arbitrary pieces of the exfoliated layered substance. The thickness of the exfoliated layered substance can be measured by, for example, using an SEM image of the exfoliated layered substance that has been captured by a scanning electron microscope. Note that the thickness of the exfoliated layered substance is minimized when it consists of a single unit layer. The minimum thickness varies depending on the exfoliated layered substance, but may be approximately 1 nm. For example, of exfoliated layered substances derived from graphite, an exfoliated layered substance consisting of a single unit layer is called graphene and theoretically has a thickness of about 0.335 nm.

From the viewpoint of obtaining a sufficient property-improving effect and also facilitating the exfoliation of the exfoliated layered substance, it is preferable that the average area of the exfoliated layered substance is 0.1 to 500 $\mu m^2$, more preferably 0.5 to 300 $\mu m^2$, even more preferably 1.0 to 130 $\mu m^2$, and particularly preferably 1.0 to 30 $\mu m^2$. In the present invention, the area of the exfoliated layered substance means the area of the exfoliated layered substance when seen in a plan view, and the average area means the average value of the areas of fifty or more arbitrary pieces of the exfoliated layered substance. The area of the exfoliated layered substance can be measured by, for example, using an image that is obtained by dropping a dilute dispersion of the exfoliated layered substance onto filter paper and imaging the exfoliated layered substance using a microscope.

There is no particular limitation on the method for exfoliating a layered substance, and the exfoliation can be performed by applying a shear force, ultrasonic vibrations, cavitation, or the like to a layered substance using a known apparatus. Examples of the known apparatus that can be used for the exfoliation include stirred media mills, such as a sand mill, an attritor, and a bead mill; container-driven mills that use balls or rods as the media, such as a rotary mill, a vibration mill, and a planetary mill; a jet mill, a roll mill, a hammer mill, a pin mill, a high-pressure emulsifying machine, and an ultrasonic emulsifying machine. Examples of the high-pressure emulsifying machine include a flow-through-type high-pressure emulsifying machine and a collision-type high-pressure emulsifying machine. Examples of the form of the flow-through system of the flow-through-type high-pressure emulsifying machine include a single-nozzle form and a slit-nozzle form. Examples of the form of the collision system of the collision-type high-pressure emulsifying machine include a form in which a liquid containing the raw material is made to collide with a flat surface of a valve or the like, or a spherical surface of a ball or the like, and a form in which liquids containing the raw material are made to collide with each other.

When exfoliating the layered substance, either a wet exfoliation method that uses a solvent or a dry exfoliation method that does not use a solvent may be used, and the wet exfoliation method or the dry exfoliation method can be selected in accordance with the exfoliation method of the apparatus to be used.

As the solvent used in the wet exfoliation method, it is preferable to use alcoholic solvents such as methanol, ethanol, isopropanol, ethylene glycol, propylene glycol, and methoxyethanol; ketonic solvents such as acetone and methyl ethyl ketone; heterocyclic solvents such as pyridine, piperidine, morpholine, tetrahydrofuran, and dioxane; ionic liquids such as 1-ethyl-3-methylimidazolium tetrafluoroborate and 1-butyl-3-methylimidazolium hexafluorophosphate; and dimethylformamide, N-methylpyrrolidone, dimethyl sulfoxide, water, and the like, in view of their unlikelihood of being charged with static electricity.

A water-soluble salt may also be used when exfoliating the layered substance. In the exfoliation process, the water-soluble salt functions in the following manner: a water-soluble salt in solid form functions as a medium that accelerates exfoliation, and a water-soluble salt dissolved in a solvent acts on interlayer spaces of the layered substance and thereby accelerates exfoliation. After the exfoliation, the water-soluble salt can be easily removed through washing with water. Preferred water-soluble salts may be sodium chloride, potassium chloride, magnesium chloride, sodium sulfate, potassium sulfate, calcium sulfate, and sodium acetate, and the like.

Compound Having Reactive Group

The composite material of the present invention has the following features: the surface of the exfoliated layered substance is coated with a compound having a reactive group, the compound having a reactive group is a compound (hereinafter also referred to as a "specific reactive group compound") having at least one reactive group selected from the group consisting of an epoxy group, an oxetanyl group, an isocyanate group, an acrylic group, a methacrylic group, a vinyl ether group, a vinyl ester group, and a hydrolyzable silyl group, and the compound having a reactive group is contained in an amount of 0.1 to 100 parts by mass with respect to 100 parts by mass of the exfoliated layered substance.

It is sufficient that the specific reactive group compound has at least one reactive group selected from the group consisting of an epoxy group, an oxetanyl group, an isocyanate group, an acrylic group, a methacrylic group, a vinyl ether group, a vinyl ester group, and a hydrolyzable silyl group. In the case where the specific reactive group compound has two or more reactive groups, the two or more reactive groups may be the same, or may be different from each other. In the present invention, from the viewpoint of improving the dispersibility of the composite material even more, it is preferable that the specific reactive group compound has an epoxy group, an oxetanyl group, an isocyanate group, or a methacrylic group, more preferably an epoxy group or an oxetanyl group, and particularly preferably an epoxy group.

With a high boiling point, the compound having a reactive group is unlikely to evaporate, and it is therefore preferable that the compound having a reactive group used in the present invention has a boiling point of preferably 100° C. or higher, more preferably 120° C. or higher, and even more preferably 150° C. or higher.

Specific Reactive Group Compound Having Epoxy Group

Examples of the specific reactive group compound having an epoxy group include: monofunctional phenol glycidyl ethers, such as phenyl glycidyl ether, methylphenyl glycidyl ether, vinylphenyl glycidyl ether, isopropenylphenyl glycidyl ether, and nonylphenyl glycidyl ether;

bifunctional phenol glycidyl ethers, such as catechol diglycidyl ether, resorcinol diglycidyl ether, hydroquinone diglycidyl ether, 4,4'-biphenyldiol diglycidyl ether, and diglycidyl ethers of bisphenols, such as 4,4'-oxybisphenol diglycidyl ether, bisphenol A type epoxy resin, bisphenol F type epoxy resin, bisphenol B diglycidyl ether, bisphenol S diglycidyl ether, and bisphenol AF diglycidyl ether;

trifunctional phenol glycidyl ethers, such as tri(hydroxyphenyl)methane triglycidyl ether, tri(hydroxyphenyl)ethane triglycidyl ether, 1,1,3-tri(hydroxyphenyl)propane triglycidyl ether, and trisphenol PA triglycidyl ether; tetrafunctional phenol glycidyl ethers, such as tetra(hydroxyphenyl)ethane tetraglycidyl ether;

condensed phenol glycidyl ethers, such as phenol novolac type epoxy resin, cresol novolac type epoxy resin, bisphenol A novolac type epoxy resin, dicyclopentadiene-phenol addition reaction type epoxy resin, an epoxidized product that is a condensate of a phenol and an aromatic aldehyde having a phenolic hydroxyl group, and biphenyl novolac type epoxy resin; 1,2-epoxyalkane compounds, such as 1,2-epoxyhexane, 1,2-epoxyoctane, 1,2-epoxydecane, 1,2-epoxydodecane, 1,2-epoxytetradecane, 1,2-epoxyhexadecane, 1,2-epoxyoctadecane, and 1,2-epoxyeicosane; aliphatic alcohol glycidyl ether compounds, such as allyl glycidyl ether, butyl glycidyl ether, 2-ethylhexyl glycidyl ether, octyl glycidyl ether, decyl glycidyl ether, dodecyl glycidyl ether, hexadecyl glycidyl ether, octadecyl glycidyl ether, and oleyl glycidyl ether;

glycidyl ethers of aliphatic polyhydric alcohols or aliphatic polyhydric alcohol ethers, such as (poly)ethylene glycol diglycidyl ether, (poly)propylene glycol diglycidyl ether, 1,4-butanediol diglycidyl ether, neopentyl glycol diglycidyl ether, 1,6-hexanediol diglycidyl ether, triglycidyl ether of glycerol, triglycidyl ether of trimethylolpropane, tetraglycidyl ether of sorbitol, hexaglycidyl ether of dipentaerythritol, diglycidyl ether of polyethylene glycol, and diglycidyl ether of polypropylene glycol; glycidyl ethers of alicyclic alcohols, such as cyclohexyl glycidyl ether, hydrogenated bisphenol A diglycidyl ether, hydrogenated bisphenol F diglycidyl ether, and cyclohexanediol diglycidyl ether;

carboxylic acid glycidyl ester compounds, such as glycidyl acrylate, glycidyl methacrylate, glycidyl neopentanoate, glycidyl neodecanoate, glycidyl oleate, glycidyl stearate, glycidyl benzoate, glycidyl 4-t-butyl benzoate, diglycidyl adipate, diglycidyl phthalate, diglycidyl tetrahydrophthalate, diglycidyl hexahydrophthalate, and diglycidyl methyl 5-norbornene-2,3-dicarboxylate; diglycidyl amine compounds, such as diglycidyl aniline, diglycidyl cyclohexylamine, diglycidyl benzylamine, tetraglycidyl xylenediamine, tetraglycidyl methylenedianiline, tetraglycidyl(aminomethyl)cyclohexane, and triglycidyl p-aminophenol;

alicyclic epoxy compounds, such as 1,2-epoxycyclohexane, 3,4-epoxycyclohexylmethanol, 3,4-epoxycyclohexylmethyl acrylate, 3,4-epoxycyclohexylmethyl methacrylate, 1,2-epoxy-4-vinylcyclohexane, methyl 3,4-epoxycyclohexane carboxylate, allyl 3,4-epoxycyclohexane carboxylate, octyl 3,4-epoxycyclohexane carboxylate, dialyl 4,5-epoxycyclohexane-1,2-dicarboxylate, dioctyl 4,5-epoxycyclohexane-1,2-dicarboxylate, distearyl 4,5-epoxycyclohexane-1,2-dicarboxylate, 3,4-epoxycyclohexylmethyl-3,4-epoxycyclohexane carboxylate, methylenebis(3,4-epoxycyclohexane), 2,2-bis(3,4-epoxycyclohexyl)propane, dicyclopentadiene diepoxide, 3,4-epoxy-6-methylcyclohexane carboxylate, ethylenebis(3,4-epoxycyclohexanecarboxylate), 1-epoxyethyl-3,4-epoxycyclohexane, bis(3,4-epoxycyclohexylmethyl) adipate, 1-(1,2-epoxyethyl)-3,4-epoxycyclohexane, bis(3,4-epoxycyclohexylethyl) dimethylsilane, bis(3,4-epoxycyclohexylethyl) phenylmethylsilane, 3,4-epoxycyclohexane-1,2-dicarboxylic acid diglycidyl ester, α-pinene oxide, and limonene dioxide;

silicon-containing epoxy compounds, such as 3,4-epoxycyclohexyltrimethoxysilane, 3,4-epoxylcyclohexylethyltrimethoxysilane, 3,4-epoxycyclohexylethylmethyldimethoxysilane, 3,4-epoxycyclohexylethyltriethoxysilane, glycidoxypropyltrimethoxysilane, glycidoxypropylmethyldimethoxysilane, glycidoxypropyltriethoxysilane, 1,3-di(glycidyloxypropyl)-1,1,3,3-tetramethyldisiloxane, 1,3-bis(3,4-epoxycyclohexylethyl)-1,1,3,3-tetramethyldisiloxane, and 2,4,6,8-tetramethyl-1,3,5,7-tetra(glycidyloxypropyl)cyclotetrasiloxane;

epoxycyclohexane compounds, such as diallyl glycidyl isocyanurate, allyl diglycidyl isocyanurate, and triglycidyl isocyanurate; epoxized unsaturated fatty acid esters, such as epoxidized soybean oil, epoxidized linseed oil, octyl epoxystearate, and butyl epoxystearate; and epoxidized polydiene compounds, such as epoxidized polybutadiene and epoxidized polyisoprene.

The bisphenol A type epoxy resin above includes bisphenol A diglycidyl ether and also diglycidyl ether that has at least two bisphenol A skeletons in the molecule. The bisphenol A type epoxy resin is a compound represented by the general formula (1) below. For example, bisphenol A diglycidyl ether is a compound wherein n is 0. Similarly, the bisphenol F type epoxy resin includes bisphenol F diglycidyl ether and also diglycidyl ether that has at least two bisphenol F skeletons in the molecule.

[Chem. 1]

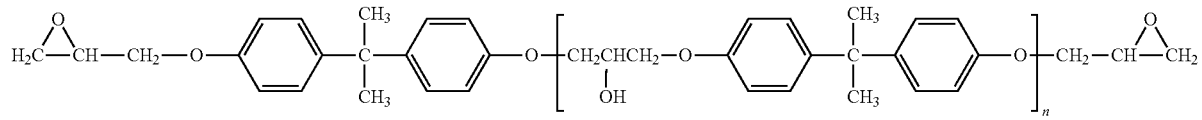

(1)

wherein n represents a number of 0 to 100.

Specific Reactive Group Compound Having Oxetanyl Group

Examples of the specific reactive group compound having an oxetanyl group include: monofunctional oxetane compounds, such as 3-alkyl-3 aryloxyoxetane such as 3-ethyl-3-[(phenoxy)methyl]oxetane, 3-alkyl-3-(oxyalkyl)oxetane such as 3-ethyl-3-(hexyloxymethyl)oxetane and 3-ethyl-3-(2-ethylhexyloxymethyl)oxetane, 3-alkyl-3-(hydroxyalkyl)oxetane such as 3-ethyl-3-(hydroxymethyl)oxetane, 3-alkyl-3-(hydroxyalkyl)oxetane such as 3-ethyl-3-(chloromethyl)oxetane, and 3-alkyl-3-(alkyl halide)oxetane; and bifunctional oxetane compounds of bisoxetane, such as alkane compounds in which two groups having an oxetanyl group are bonded to an alkane, such as 3,7-bis(3-oxetanyl)-5-oxa-nonane, 1,2-bis[(3-ethyl-3-oxetanylmethoxy)methyl] ethane, 1,3-bis[(3-ethyl-3-oxetanylmethoxy)methyl]propane, 1,4-bis(3-ethyl-3-oxetanylmethoxy)butane, and 1,6-bis(3-ethyl-3-oxetanylmethoxy)hexane, compounds in which two groups having an oxetanyl group are bonded to a benzene ring, such as 1,4-bis[(3-ethyl-3-oxetanylmethoxy) methyl]benzene and xylylene bisoxetane, as well as ethylene glycol bis(3-ethyl-3-oxetanylmethyl) ether, triethylene glycol bis(3-ethyl-3-oxetanylmethyl) ether, and tetraethylene glycol bis(3-ethyl-3-oxetanylmethyl) ether.

Specific Reactive Group Compound Having Isocyanate Group

Examples of the specific reactive group compound having an isocyanate group include: monoisocyanate compounds, such as hexyl isocyanate, octyl isocyanate, decyl isocyanate, dodecyl isocyanate, octadecyl isocyanate, benzyl isocyanate, methylbenzyl isocyanate, 2-isopropenyl-dimethylbenzyl isocyanate, phenyl isocyanate, methylphenyl isocyanate, dimethylphenyl isocyanate, isopropylphenyl isocyanate, biphenyl isocyanate, cyclohexyl isocyanate, methacryloyl isocyanate, acryloxyethyl isocyanate, methacryloxyethyl isocyanate, and isocyanatopropyltrimethoxysilane;

aromatic diisocyanate compounds, such as 2,4-tolylene diisocyanate, 2,6-tolylene diisocyanate, diphenylmethane-4,4'-diisocyanate, p-phenylene diisocyanate, xylylene diisocyanate, 1,5-naphthalene diisocyanate, 3,3'-dimethyldiphenyl-4,4'-diisocyanate, dianisidine diisocyanate, and tetramethylxylylene diisocyanate;

alicyclic diisocyanate compounds, such as isophorone diisocyanate, dicyclohexylmethane-4,4'-diisocyanate, trans-1,4-cyclohexyl diisocyanate, and norbornene diisocyanate; aliphatic diisocyanates, such as 1,4-tetramethylene diisocyanate, 1,6-hexamethylene diisocyanate, 1,8-octamethylene diisocyanate, 2-methyl-1,5-pentamethylene diisocyanate, 2,2-dimethyl-1,5-pentamethylene diisocyanate, 1,11-undecamethylene diisocyanate, 2,2,4-trimethyl-1,6-hexamethylene diisocyanate, 2,4,4-trimethyl-1,6-hexamethylene diisocyanate, 2,4-dimethyl-1,8-octamethylene diisocyanate, 5-methyl-1,9-nonamethylene diisocyanate, lysine diisocyanate, and lysine methyl ester diisocyanate; and trifunctional or higher functional isocyanates, such as isocyanurate trimers of the above diisocyanates, adducts of the above diisocyanates with trimethylolpropane, biuret trimers of the above diisocyanates, allophanates of the above diisocyanates, triphenylmethane triisocyanate, 1-methylbenzol-2,4,6-triisocyanate, dimethyltriphenylmethane tetraisocyanate, 1,5,11-undecamethylene triisocyanate, and 2,4,6-toluene triisocyanate.

The specific reactive group compound having an isocyanate group may be a blocked isocyanate compound in which the isocyanate group is blocked with a blocking agent in order to suppress the reactivity. Examples of the isocyanate group blocking agent include: oxime-based blocking agents, such as formaldoxime, acetaldoxime, acetoxime, methyl ethyl ketoxime, diacetyl monoxime, and cyclohexane oxime; and pyrazole-based blocking agents, such as pyrazole, 3,5-dimethylpyrazole, and 4-benzyl-3,5-dimethylpyrazole, 4-nitro-3,5-dimethylpyrazole, 4-bromo-3,5-dimethylpyrazole, and 3-methyl-5-phenylpyrazole.

Specific Reactive Group Compound Having Acrylic Group

Examples of the specific reactive group compound having an acrylic group include: acrylic acid and salts thereof; compounds having one acrylic group, such as methyl acrylate, ethyl acrylate, propyl acrylate, butyl acrylate, isobutyl acrylate, t-butyl acrylate, octylhexyl acrylate, 2-ethylhexyl acrylate, isononyl acrylate, dodecyl acrylate, isotridecyl acrylate, octadecyl acrylate, allyl acrylate, phenyl acrylate, methylphenyl acrylate, benzyl acrylate, cyclohexyl acrylate, isonorbornyl acrylate, hydroxyadamantyl acrylate, dicyclopentenyloxyethyl acrylate, hydroxyethyl acrylate, hydroxypropyl acrylate, hydroxybutyl acrylate, cyclohexanediol monoacrylate, methoxyethyl acrylate, methoxypolyethylene glycol acrylate, ethoxyethyl acrylate, ethoxyethoxyethyl acrylate, allyloxyethyl acrylate, phenoxyethyl acrylate, phenoxypolyethylene glycol acrylate, nonylphenoxypolyethylene glycol acrylate, dimethylaminoethyl acrylate, diethylaminoethyl acrylate, tetrahydrofurfuryl acrylate, acrylamide, N-methylacrylamide, N-ethylacrylamide, N-hydroxyethyl acrylamide, N-phenylacrylamide, N-(hydroxyphenyl)acrylamide, N-(sulfamoylphenyl)acrylamide, N-(phenylsulfonyl)acrylamide, N-(tolylsulfonyl)acrylamide, N,N-dimethylacrylamide, N-methyl-N-phenylacrylamide, and N-hydroxyethyl-N-methylacrylamide, acryloylmorpholine, and acryloxypropyltrimethoxysilane;

compounds having two acrylic groups, such as ethylene glycol diacrylate, tetraethylene glycol diacrylate, polyethylene glycol diacrylate, propylene glycol diacrylate, tripropylene glycol diacrylate, polypropylene glycol diacrylate, butanediol diacrylate, neopentyl glycol diacrylate, nonanediol diacrylate, cyclohexanediol diacrylate, cyclohexane dimethanol diacrylate, bisphenol A ethoxylate diacrylate, and neopentyl glycol hydroxypivalic acid ester diacrylate;

and compounds having three or more acrylic groups, such as glycerol triacrylate, trimethylolpropane triacrylate, trimethylolpropane ethoxylate triacrylate, pentaerythritol triacrylate, pentaerythritol tetraacrylate, dipentaerythritol pentaacrylate, and dipentaerythritol hexaacrylate.

Specific Reactive Group Compound Having Methacrylic Group

Examples of the specific reactive group compound having a methacrylic group include: methacrylic acid and salts thereof; compounds having one methacrylic group, such as methyl methacrylate, ethyl methacrylate, propyl methacrylate, butyl methacrylate, isobutyl methacrylate, t-butyl methacrylate, octylhexyl methacrylate, 2-ethylhexyl methacrylate, isononyl methacrylate, dodecyl methacrylate, isotridecyl methacrylate, octadecyl acrylate, allyl acrylate, octadecyl methacrylate, cyclohexyl methacrylate, isonorbornyl methacrylate, hydroxyadamantyl methacrylate, dihydroxyadamantyl methacrylate, dicyclopentanyl methacrylate, dicyclopentenyloxyethyl methacrylate, glycidyl methacrylate, dimethylaminoethyl methacrylate, diethylaminoethyl methacrylate, tetrahydrofurfuryl methacrylate, hydroxyethyl methacrylate, hydroxypropyl methacrylate, hydroxybutyl methacrylate, cyclohexanediol monomethacrylate, methoxyethyl methacrylate, dimethylaminoethyl methacrylate, diethylaminoethyl methacrylate, ethoxyethyl methacrylate, ethoxyethoxyethyl methacrylate, methacryloxypropylmethyldimethoxysilane, methacryloxypropyltrimethoxysilane, methacryloxypropylmethyldiethoxysilane, and methacryloxypropyltriethoxysilane;

compounds having two methacrylic groups, such as alkylene glycol dimethacrylates such as diethylene glycol dimethacrylate, tetraethylene glycol dimethacrylate, polyethylene glycol dimethacrylate, propylene glycol dimethacrylate, tripropylene glycol dimethacrylate, polypropylene glycol dimethacrylate, butanediol dimethacrylate, neopentyl glycol dimethacrylate, nonanediol dimethacrylate, cyclohexanediol dimethacrylate, and cyclohexanedimethanol dimethacrylate, bisphenol A ethoxylate dimethacrylate, and neopentyl glycol hydroxypivalic acid ester dimethacrylate; and compounds having three methacrylic groups, such as glycerol trimethacrylate and trimethylolpropane trimethacrylate.

Specific Reactive Group Compound Having Vinyl Ether Group

Examples of the specific reactive group compound having a vinyl ether group include butyl vinyl ether, isobutyl vinyl ether, cyclohexyl vinyl ether, octyl vinyl ether, hydroxyethyl vinyl ether, hydroxyethoxyethyl vinyl ether, hydroxybutyl vinyl ether, and diethylaminoethyl vinyl ether.

Specific Reactive Group Compound Having Vinyl Ester Group

Examples of the specific reactive group compound having a vinyl ester group include vinyl hexanoate, vinyl pivalate, vinyl octanoate, vinyl neodecanoate, vinyl isononanoate, and vinyl benzoate.

Specific Reactive Group Compound Hydrolyzable Silyl Group

Examples of the specific reactive group compound having a hydrolyzable silyl group include: methyltrimethoxysilane, methyltriethoxysilane, dimethyldiethoxysilane, ethyltrimethoxysilane, butyltrimethoxysilane, phenyltrimethoxysilane, phenylmethyldimethoxysilane, diphenyldimethoxysilane, hexyltriethoxysilane, octyltriethoxysilane, decyltrimethoxysilane, 1,6-bis(trimethoxysilyl)hexane, fluoropropyltrimethoxysilane, vinyltrimethoxysilane, vinyltriethoxysilane, 3,4-epoxycyclohexyltrimethoxysilane, 3,4-epoxycyclohexylethyltrimethoxysilane, 3,4-epoxycyclohexylethylmethyldimethoxysilane, 3,4-epoxycyclohexylethyltriethoxysilane, glycidoxypropyltrimethoxysilane, glycidoxypropylmethyldimethoxysilane, glycidoxypropyltriethoxysilane, styryltrimethoxysilane, methacryloxypropylmethyldimethoxysilane, methacryloxypropyltrimethoxysilane, methacryloxypropylmethyldiethoxysilane, methacryloxypropyltriethoxysilane, acryloxypropyltrimethoxysilane, tris-(trimethoxysilylpropyl)isocyanurate, and isocyanatopropyltriethoxysilane.

Composite Material of the Present Invention

In the composite material of the present invention, the surface of the exfoliated layered substance is coated with the specific reactive group compound. In the present invention, the specific reactive group compound may coat at least a portion of the surface of the exfoliated layered substance, or the entire surface thereof, but it is preferable that the specific reactive group compound coats at least a larger fraction of the surface of the exfoliated layered substance. Furthermore, the specific reactive group compound may coat the surface of the exfoliated layered substance continuously or discontinuously.

In the composite material of the present invention, the amount of compound having a reactive group is 0.1 to 100 parts by mass with respect to 100 parts by mass of the exfoliated layered substance. If the amount of compound having a reactive group is less than 0.1 parts by mass, coating with the compound having a reactive group may be insufficient. On the other hand, if the amount of compound having a reactive group is greater than 100 parts by mass, the effect obtained by the increase in amount is not proportional to the amount used, and, moreover, when the composite material of the present invention is used added to a resin or the like, the properties of the resin or the like may be adversely affected. The amount of compound having a reactive group with respect to 100 parts by mass of the exfoliated layered substance is preferably 0.2 to 70 parts by mass, more preferably 0.5 to 60 parts by mass, and most preferably 1 to 50 parts by mass.

Examples of the method for coating the exfoliated layered substance with the compound having a reactive group include the following methods: a method in which the compound having a reactive group is added dropwise to the exfoliated layered substance under stirring; a method in which a vapor or mist of the compound having a reactive group is sprayed onto the exfoliated layered substance; and a method in which the exfoliated layered substance is dipped in a solution of the compound having a reactive group. Since the exfoliated layered substance is likely to aggregate, in order to coat the exfoliated layered substance with the compound having a reactive group, it is necessary to perform the coating operation while disintegrating secondary particles formed through aggregation of the exfoliated layered substance particles. In view of the ease of coating while disintegrating the secondary particles, the method (hereinafter referred to as the "dipping method") in which the exfoliated layered substance is dipped in a solution of the compound having a reactive group is preferably used as the method for coating the exfoliated layered substance with the compound having a reactive group.

In the dipping method, simply dipping the exfoliated layered substance in the solution of the compound having a reactive group is insufficient to disintegrate the secondary particles of the exfoliated layered substance, and the solution in which the exfoliated layered substance is dipped needs to be subjected to a shear force, ultrasonic vibrations, cavitation, or the like with use of a dispersion apparatus.

Examples of the dispersion apparatus that can be used for this purpose include high-speed rotary shearing type stirring machines, such as a homomixer; stirred media mills, such as a sand mill, an attritor, and a bead mill; container-driven mills that use balls or rods as the media, such as a rotary mill, a vibration mill, and a planetary mill; a colloid mill, a high-pressure emulsifying machine, an ultrasonic emulsifying machine, and the like. Examples of the high-pressure emulsifying machine include a flow-through-type high-pressure emulsifying machine and a collision-type high-pressure emulsifying machine. An example of the form of the flow-through system of the flow-through-type high-pressure emulsifying machine is a single-nozzle form. Examples of the form of the collision system of the collision-type high-pressure emulsifying machine include a form in which a liquid containing the raw material is made to collide with a flat surface of a valve or the like, or a spherical surface of a ball or the like, and a form in which liquids containing the raw material are made to collide with each other. Note that, if a strong shear force is applied to the exfoliated layered substance, the number of layers, the thickness, the particle size, and the like of the exfoliated layered substance may become smaller than those before coating.

The dipping method may be performed by adding the exfoliated layered substance to a solution of the compound having a reactive group and then disintegrating the secondary particles of the exfoliated layered substance, or by adding the exfoliated layered substance to a solvent, disintegrating the secondary particles of the exfoliated layered substance, and then dissolving the compound having a reactive group in the solution. Note that, in the case where the compound having a reactive group has a low boiling point and can be removed by heating, reducing the pressure, or the like, the compound having a reactive group may be used as-is without using a solution of the compound having a reactive group. The solvent used for the solution of the compound having a reactive group can be selected with consideration given to the solubility of the compound having a reactive group, the ease of removal after coating with the compound having a reactive group has been completed, the safety (toxicity, flammability, chargeability, etc.), and the like. Examples of the solvent used in the dipping method include alcoholic solvents, such as methanol, ethanol, isopropanol, and methoxyethanol; ketonic solvents, such as acetone and methyl ethyl ketone; and water. The ratio between the exfoliated layered substance and the solution of the compound having a reactive group varies depending on the fluidity of a slurry containing the exfoliated layered substance, the pulverization apparatus, and the like, but the amount of the solution of the compound having a reactive group is about 200 to 5,000 parts by mass, with respect to 100 parts by mass of the exfoliated layered substance.

After that, according to the dipping method, the exfoliated layered substance is dipped in the solution of the compound having a reactive group, the secondary particles of the exfoliated layered substance are disintegrated, and then, the solvent or an excess of the compound having a reactive group is removed, and a composite substance of the present invention is thus obtained. Note that, after the disintegration of the secondary particles of the exfoliated layered substance, it is also possible to remove a portion of the solution of the compound having a reactive group or the excess of the compound having a reactive group through filtration, centrifugation, or the like and then remove the remainder, if necessary.

There is no particular limitation on the method for removing the solvent or the excess of the compound having a reactive group, and a method such as heat drying, vacuum drying, spray drying, or freeze drying, or a combination of these methods can be used. The obtained composite material of the present invention may be pulverized or granulated, if necessary.

In the composite material of the present invention, the surface of the exfoliated layered substance is coated with the compound having a reactive group. Therefore, aggregation of the exfoliated layered substance is prevented, and hence the dispersibility in a base material is significantly improved. Thus, the effect of the exfoliated layered substance of improving the properties of the base material can be achieved, or more specifically, for example, conductivity, heat dissipation properties, mechanical properties (impact resistance, flexural strength, compression strength, etc.), and other properties can be improved. The composite material of the present invention can be favorably used in applications such as an additive for a resin, an elastomer, a paint, or the like; a conductive additive for a battery electrode; and the like.

In the composite material of the present invention, preferred combinations of the exfoliated layered substance and the compound having a reactive group are as follows. The following combinations improve the dispersibility of the composite material even more when used, and are therefore preferable.

A graphite and a compound having an epoxy group
A graphite and a compound having an oxetanyl group
A graphite and a compound having an isocyanate group
A graphite and a compound having an oxetanyl group
A boron nitride and a compound having an epoxy group Next, a synthetic resin composition of the present invention will be described. The synthetic resin composition of the present invention contains the composite material of the present invention and a synthetic resin. In the synthetic resin composition of the present invention, examples of the resin that can be used in the synthetic resin composition of the present invention include a phenolic resin, an epoxy resin, a melamine resin, a urea resin, an unsaturated polyester resin, polyurethane, thermosetting polyimide, polyethylene, polypropylene, polyvinyl chloride, polystyrene, polyvinyl acetate, a fluororesin, an ABS resin, an AS resin, and an acrylic resin. The amount of composite material contained in the synthetic resin composition of the present invention varies depending on the type of the synthetic resin and the required properties, but the amount of composite material of the present invention is 1 to 150 parts by mass, and preferably 2 to 100 parts by mass, with respect to 100 parts by mass of the synthetic resin.

EXAMPLES

Hereinafter, the present invention will be described in greater detail using examples and comparative examples. However, the present invention is not limited to the examples and the like given below. Unless otherwise stated, the terms "part" and "%" used in the examples mean "part by mass" and "% by mass", respectively.

Production Example 1

An exfoliated layered substance A1 was prepared from natural graphite in accordance with Example 1 of WO 2013/172350. Specifically, 74 parts by mass of 1-butyl-3-methylimidazolium hexafluorophosphate and 26 parts by mass of polyethylene glycol (product name: Polyethylene Glycol 20000 manufactured by FUJIFILM Wako Pure Chemical Corporation) were mixed, and dissolved through heating, and 10 parts by mass of natural graphite (manufactured by FUJIFILM Wako Pure Chemical Corporation) was dispersed in the solution. Then, 0.6 g of this dispersion was collected into a 0.5-cm$^3$ vial, the vial was closed with a cap, and then, the dispersion was irradiated with microwaves of 2,450 MHz at 170° C. for 30 minutes using a microwave synthesizer (Initiator+ manufactured by Biotage Japan Ltd.). After that, the dispersion was washed with acetone, followed by filtration and then heat drying in an oven, and an exfoliated layered substance A1 derived from natural graphite was thus obtained. The exfoliated layered substance A1 had an average thickness of 123 nm and an average area of 11.6 µm$^2$.

Production Example 2

Similar operations to those of Production Example 1 were performed, except that natural graphite was replaced with expanded graphite (product name: EC1500 manufactured by Ito Graphite Co., Ltd.), and an exfoliated layered substance A2 derived from expanded graphite was thus obtained. The exfoliated layered substance A2 had an average thickness of 30 nm and an average area of 1.4 µm$^2$.

Production Example 3

Similar operations to those of Production Example 1 were performed, except that natural graphite was replaced with boron nitride (manufactured by Aldrich), and an exfoliated layered substance A3 derived from boron nitride was thus obtained. The exfoliated layered substance A3 had an average thickness of 183 nm and an average area of 10.3 µm$^2$.

Coating Substances
- B1: Bisphenol A type epoxy resin (a compound represented by the general formula (1), wherein n is 0, product name: ADEKA RESIN EP4100E manufactured by ADEKA Corporation)
- B2: Xylylenebisoxetane (a bifunctional oxetane compound, product name: ARON OXETANE OXT-121 manufactured by Toagosei Co., Ltd.)
- B3: 75% Methyl ethyl ketone solution of a blocked isocyanate compound of 4,4'-dicyclohexylmethane diisocyanate (MDI) (The method for producing B3 will be described below.)
- B4: Diethylene glycol dimethacrylate (bifunctional methacrylate, product name: NK ester 2G manufactured by Shin-Nakamura Chemical Co., Ltd.)
- C1: Polyvinyl alcohol (product name: PVA-217 manufactured by Kuraray Co., Ltd.)

Method for Producing B3

45 parts by mass of 4,4'-dicyclohexylmethane diisocyanate, 31.4 parts by mass of methyl ethyl ketoxime serving as a blocking agent, and 23.4 parts by mass of methyl ethyl ketone serving as a solvent were fed into a reaction vessel, and reacted at 80° C. for 5 hours under stirring.

Production of Composite Materials

The exfoliated layered substances, the coating substances, and solvents were used in combinations shown in Table 1. With use of a bead mill (product name: UAM-015 manufactured by Kotobuki Industries Co., Ltd.), the exfoliated layered substance was dipped in a solution containing the coating substance, and the secondary particles of the exfoliated layered substance were pulverized. Then, the solvent was removed through heat and vacuum drying. In this manner, composite materials of Examples 1 to 9 and Comparative Examples 1 and 2 were produced. Note that, in Table 1, numbers in parentheses represent mass ratios, and MEK in the solvent section means methyl ethyl ketone. Note that water was used as the solvent in Comparative Example 1 because polyvinyl alcohol used as the coating substance is unlikely to dissolve in methyl ethyl ketone.

TABLE 1

| | Exfoliated layered substance | Coating substance | Solvent |
|---|---|---|---|
| Example 1 | A1 (70) | B1 (30) | MEK (1400) |
| Example 2 | A1 (95) | B1 (5) | MEK (1400) |
| Example 3 | A1 (62) | B1 (38) | MEK (1400) |
| Example 4 | A1 (70) | B2 (30) | MEK (1400) |
| Example 5 | A1 (70) | B3 (30) | MEK (1400) |
| Example 6 | A1 (70) | B4 (30) | MEK (1400) |
| Example 7 | A2 (70) | B1 (30) | MEK (1400) |
| Example 8 | A2 (70) | B4 (30) | MEK (1400) |
| Example 9 | A3 (70) | B1 (30) | MEK (1400) |
| Comparative Example 1 | A1 (70) | C1 (30) | Water (1400) |
| Comparative Example 2 | A3 (70) | C1 (30) | Water (1400) |

Evaluation 1 of Resins

The composite material or the exfoliated layered substance shown in Table 2, 100 parts by mass of a bisphenol A type epoxy resin (product name: ADEKA RESIN EP4100E manufactured by ADEKA Corporation), and 0.5 parts by mass of an imidazole catalyst (1-benzyl-2-methylimidazole) were mixed using a planetary stirring and defoaming apparatus. The composite material or the exfoliated layered substance was used in an amount shown in Table 2. In Table 2, numbers in parentheses represent amounts in parts by mass, with respect to 100 parts by mass of the bisphenol A type epoxy resin. The resulting mixture was heated at a temperature of 160° C. and a pressure of 5 MPa for one hour and then cured by hot pressing, and a sheet with a thickness of 3 mm was thus prepared. This sheet was cut into a square with sides of 50 mm long and used as a test piece.

Evaluation of Dispersibility

The resin sheets of Examples 10 to 14 and Comparative Examples 3 to 5 were cut using a microtome. Center portions of the respective cross sections were imaged using a microscope, and the number of particles per area of 300 µm×300 µm and the percentage of aggregates were measured using a piece of image analysis software. Note that the percentage of aggregates was the percentage (%) of the total area of aggregates with respect to the total area of particles, where particles having an area of 40 µm$^2$ or greater were regarded as aggregates. The greater the number of particles, the better the dispersibility. The greater the percentage of aggregates, the higher the proportion of aggregates. Table 2 shows the results.

TABLE 2

| | Composite material or exfoliated layered substance | Number of particles | Percentage of aggregates (%) |
|---|---|---|---|
| Example 10 | Example 1 (35) | 7581 | 2.1 |
| Example 11 | Example 2 (35) | 6392 | 4.2 |
| Example 12 | Example 3 (35) | 8013 | 0.8 |
| Example 13 | Example 4 (35) | 7229 | 2.3 |
| Example 14 | Example 7 (10) | 12523 | 7.4 |
| Comparative Example 3 | A1 (35) | 4878 | 15.0 |

TABLE 2-continued

| Composite material or exfoliated layered substance | | Number of particles | Percentage of aggregates (%) |
|---|---|---|---|
| Comparative Example 4 | A2 (10) | 7325 | 58.2 |
| Comparative Example 5 | Comparative Example 1 (35) | 5633 | 11.4 |

The flexural stress, flexural strain, flexural modulus, surface resistance value, and thermal conductivity of the resin sheets of Examples 10 to 14 and Comparative Examples 3 and 4 were measured using the following methods, and the mechanical properties, electrical properties, and thermal properties of the resin sheets were evaluated. Table 3 shows the results.

Evaluation of Mechanical Properties

The sheets were processed into strips with a width of 25 mm, and the flexural stress, flexural strain, and flexural modulus were measured in conformity with Method A of JIS K7171 (Plastics-Determination of flexural properties).

Evaluation of Electrical Properties

The surface resistance value was measured using a four-probe method in conformity with JIS K7194 (Testing method for resistivity of conductive plastics with a four-point probe array).

Evaluation of Thermal Properties

The thermal conductivity was measured using a hot wire method in conformity with ASTM D7984-16.

TABLE 3

| | Mechanical properties | | | Electrical properties | Thermal properties |
|---|---|---|---|---|---|
| | Flexural stress (Mpa) | Flexural strain (%) | Flexural modulus (Gpa) | Surface resistivity (Ω/□) | Thermal conductivity (W/m · K) |
| Example 10 | 77.2 | 1.3 | 7.3 | $1.1 \times 10^5$ | 0.973 |
| Example 11 | 71.1 | 1.1 | 7.2 | $3.1 \times 10^5$ | 0.864 |
| Example 12 | 81.2 | 1.4 | 7.5 | $8.4 \times 10^4$ | 1.109 |
| Example 13 | 75.4 | 1.2 | 7.2 | $1.8 \times 10^5$ | 0.921 |
| Example 14 | 57.8 | 1.6 | 4.3 | $5.5 \times 10^6$ | 0.712 |
| Comparative Example 3 | 65.8 | 1.0 | 6.9 | $6.6 \times 10^5$ | 0.794 |
| Comparative Example 4 | 41.5 | 1.1 | 4.1 | $2.6 \times 10^7$ | 0.640 |

Comparative Example 3 was an example in which the exfoliated layered substance A1 was used. Examples 10 to 13 were examples in which the composite materials derived from the exfoliated layered substance A1 were used. Comparative Example 4 was an example in which the exfoliated layered substance A2 was used. Example 14 was an example in which the composite material derived from the exfoliated layered substance A2 was used. The composite materials of Examples 10 to 14 provided improved flexural properties (flexural stress, flexural strain, and flexural modulus), reduced surface resistivity, and improved thermal conductivity, compared with the exfoliated layered substances of Comparative Examples 3 and 4. It is considered that this is because the dispersibility of the exfoliated layered substances in the resin sheets was improved.

Evaluation 2 of Resins 100 parts by mass of polypropylene (homopolymer, melt flow rate: 8) and 2 parts by mass of the composite material or the exfoliated layered substance shown in Table 4 were kneaded at 230° C. using a twin-screw kneader and extruded to prepare a resin strand having a thickness of 4 mm Evaluation of Dispersibility The obtained resin strand was cut using a microtome. A center portion of the cross section was imaged using a microscope, and the number of particles per area of 300 μm×300 μm and the percentage of aggregates were measured in a similar manner to that of the evaluation of dispersibility described in Evaluation 1 of Resins. Table 5 shows the results.

TABLE 4

| | Composite material or exfoliated layered substance | Number of particles | Percentage of aggregates (%) |
|---|---|---|---|
| Example 15 | Example 1 | 801 | 0.0 |
| Example 16 | Example 2 | 768 | 0.0 |
| Example 17 | Example 3 | 1012 | 0.0 |
| Example 18 | Example 4 | 952 | 0.0 |
| Example 19 | Example 6 | 1117 | 0.0 |
| Example 20 | Example 7 | 734 | 6.8 |
| Comparative Example 5 | A1 | 486 | 24.7 |
| Comparative Example 6 | A2 | 139 | 75.3 |
| Comparative Example 7 | Comparative Example 1 | 677 | 5.6 |

Comparative Example 5 was an example in which the exfoliated layered substance A1 was used. Examples 15 to 19 and Comparative Example 7 were examples in which the composite materials derived from the exfoliated layered substance A1 were used. Comparative Example 6 was an example in which the exfoliated layered substance A2 was used. Example 20 was an example in which the composite material derived from the exfoliated layered substance A2 was used. The composite materials of Examples 15 to 20 had improved dispersibility, compared with the uncoated exfoliated layered substances of Comparative Examples 5 and 6. Comparative Example 7 had improved dispersibility compared with the uncoated exfoliated layered substance of Comparative Example 5, but the effect was less sufficient compared with Examples 15 to 19.

Evaluation 3 of Resins

First, 20 parts by mass of the composite material or the exfoliated layered substance shown in Table 5, 100 parts by mass of a bisphenol A type epoxy resin (product name: ADEKA RESIN EP4100E manufactured by ADEKA Corporation), and 0.5 parts by mass of an imidazole catalyst (1-benzyl-2-methylimidazole) were mixed using a planetary stirring and defoaming apparatus. The resulting mixture was heated at a temperature of 160° C. and a pressure of 5 MPa for one hour and then cured by hot pressing, and a sheet with a thickness of 3 mm was thus prepared. This sheet was cut into a square with sides of 50 mm long. Resin sheets of Example 21 and Comparative Examples 8 to 9 were thus prepared.

Evaluation of Dispersibility

The prepared resin sheets were cut using a microtome. Center portions of the respective cross sections were imaged using a scanning electron microscope, and the number of particles per area of 300 μm×300 μm and the percentage of aggregates were measured using a piece of image analysis software. Note that the percentage of aggregates was the percentage (%) of the total area of aggregates with respect to the total area of particles, where particles having an area of 50 μm$^2$ or greater were regarded as aggregates. The greater the number of particles, the better the dispersibility.

The greater the percentage of aggregates, the higher the proportion of aggregates. Table 5 shows the results.

The thermal conductivity of the resin sheets of Example 21 and Comparative Examples 8 and 9 was measured using the following method, and the thermal properties of the resin sheets was evaluated. Table 5 shows the results.

Evaluation of Thermal Properties

The thermal conductivity was measured using a hot wire method in conformity with ASTM D7984-16.

TABLE 5

| Composite material or exfoliated layered substance | Dispersibility | | Thermal properties |
|---|---|---|---|
| | Number of particles | Percentage of aggregates (%) | Thermal conductivity (W/m · K) |
| Example 21 | Example 9 | 2029 | 0.4 | 0.776 |
| Comparative Example 8 | A3 | 1544 | 7.9 | 0.703 |
| Comparative Example 9 | Comparative Example 2 | 1578 | 5.2 | 0.725 |

The synthetic resin composition of Example 21 in which the composite material of Example 9, which was the composite material of the present invention, was used had a greater number of particles, a lower percentage of aggregates, and a higher thermal conductivity, compared with the synthetic resin composition of Comparative Example 8 in which the exfoliated layered substance A2 was used and the synthetic resin composition of Comparative Example 9 in which the composite material of Comparative Example 2 was used. It can be seen from these results that the composite material of the present invention had excellent dispersibility.

The invention claimed is:

1. A composite material comprising:
   an exfoliated layered substance; and alkylene glycol dimethacrylate coating a surface of the exfoliated layered substance,
   wherein the alkylene glycol dimethacrylate is contained in an amount of 0.1 to 100 parts by mass with respect to 100 parts by mass of the exfoliated layered substance.

2. The composite material according to claim 1,
   wherein the exfoliated layered substance has an average thickness of 1,200 nm or less, and the exfoliated layered substance has an average area of 0.1 to 500 µm².

3. The composite material according to claim 1,
   wherein the exfoliated layered substance has an average thickness of 3 to 200 nm.

4. The composite material according to claim 1,
   wherein the exfoliated layered substance has an average area of 1.0 to 30 µm².

5. The composite material according to claim 1,
   wherein the exfoliated layered substance is derived from a graphite or a boron nitride.

6. The composite material according to claim 5,
   wherein the graphite is natural graphite or expanded graphite.

7. A synthetic resin composition comprising the composite material according to claim 1.

8. The composite material according to claim 2,
   wherein the exfoliated layered substance has an average thickness of 3 to 200 nm.

9. The composite material according to claim 2,
   wherein the exfoliated layered substance has an average area of 1.0 to 30 µm².

10. The composite material according to claim 3,
    wherein the exfoliated layered substance has an average area of 1.0 to 30 µm².

* * * * *